United States Patent
Hellwagner et al.

(10) Patent No.: US 8,605,794 B2
(45) Date of Patent: Dec. 10, 2013

(54) METHOD FOR SYNCHRONIZING CONTENT-DEPENDENT DATA SEGMENTS OF FILES

(75) Inventors: Hermann Hellwagner, Klagenfurt (AT);
Jörg Heufr, Oberhaching (DE);
Andreas Hutter, München (DE);
Michael Ransburg, Maria Rain (AT)

(73) Assignee: Siemens Aktiengesellschaft, Munich (DE)

( * ) Notice: Subject to any disclaimer, the term of this patent is extended or adjusted under 35 U.S.C. 154(b) by 962 days.

(21) Appl. No.: 11/918,276

(22) PCT Filed: Mar. 16, 2006

(86) PCT No.: PCT/EP2006/060808
§ 371 (c)(1),
(2), (4) Date: Jan. 21, 2009

(87) PCT Pub. No.: WO2006/108750
PCT Pub. Date: Oct. 19, 2006

(65) Prior Publication Data
US 2009/0174815 A1 Jul. 9, 2009

(30) Foreign Application Priority Data

Apr. 12, 2005 (DE) .......................... 10 2005 016 866

(51) Int. Cl.
*H04N 7/50* (2006.01)
(52) U.S. Cl.
USPC ...................................... 375/240.26; 375/240
(58) Field of Classification Search
USPC .................. 375/240.28, 240, 240.01, 240.03, 375/240.18, 240.24
See application file for complete search history.

(56) References Cited

U.S. PATENT DOCUMENTS

| | | | | |
|---|---|---|---|---|
| 4,569,026 A | * | 2/1986 | Best | 715/716 |
| 5,598,352 A | * | 1/1997 | Rosenau et al. | 715/203 |
| 5,623,424 A | * | 4/1997 | Azadegan et al. | 708/203 |
| 5,640,421 A | * | 6/1997 | Sonohara et al. | 375/240 |

(Continued)

FOREIGN PATENT DOCUMENTS

| | | | |
|---|---|---|---|
| EP | 0753954 A2 | | 1/1997 |
| EP | 1494430 | * | 6/2004 |
| EP | 1 494 430 A2 | | 1/2005 |
| JP | 2004056777 A | | 2/2004 |

OTHER PUBLICATIONS

S. Devillers et al., Metadaten streaming use case and requirements, ISO/IEC JTC 1/SC 29/WG11 M11638, Hong Kong, Jan. Apr. 8, 2005, Mar. 1, 2012.

H. Hellwagner et al., Report of CE on Bit-Stream Adap-tation in Constrained and Streaming Environments, ISO/IEC JTC 1/SC 29/WG 11 M11706, Hong Kong, Jan. 2005.

(Continued)

Primary Examiner — Eleni Shiferaw
Assistant Examiner — Abu Sholeman
(74) Attorney, Agent, or Firm — Harness, Dickey & Pierce, P.L.C.

(57) ABSTRACT

The synchronization of data segments is particularly necessary for the use of small screens. A method and a device are disclosed for synchronizing content-dependent first data segments of a first data file and content-dependent second data segments of a second data file, the first and second data segments being respectively output in sequence according to their chronological order in such a way that based on a pre-determinable assignment rule for the first and second data segments, each second data segment is output together with a corresponding first data segment.

22 Claims, 5 Drawing Sheets

(56) References Cited

U.S. PATENT DOCUMENTS

| | | | |
|---|---|---|---|
| 5,661,523 A * | 8/1997 | Yamane | 348/390.1 |
| 6,052,390 A * | 4/2000 | Deliot et al. | 370/528 |
| 6,597,861 B1 * | 7/2003 | Tozaki et al. | 386/338 |
| 6,904,610 B1 * | 6/2005 | Bayrakeri et al. | 725/54 |
| 7,099,848 B1 * | 8/2006 | Bratton | 705/57 |
| 7,194,194 B2 * | 3/2007 | Kashiwagi et al. | 386/332 |
| 7,443,367 B2 * | 10/2008 | Numao | 345/76 |
| 2001/0052943 A1 | 12/2001 | Sone | |
| 2005/0008240 A1 * | 1/2005 | Banerji et al. | 382/238 |
| 2005/0155063 A1 * | 7/2005 | Bayrakeri et al. | 725/47 |
| 2005/0237952 A1 * | 10/2005 | Punj et al. | 370/260 |
| 2005/0286783 A1 * | 12/2005 | Takada et al. | 382/236 |
| 2006/0165379 A1 * | 7/2006 | Agnihotri et al. | 386/95 |

OTHER PUBLICATIONS

I. Burnett et al., Bitstream Binding Language—a grammar for Digital Item Transport, ISO/IEC JTC 1/SC 29/WG M11611, Hong Kong, Jan. 2005.

Panis G. et al., "Bitstream Syntax Description: A Tool for Multimedia Resource Adaptation within MPEG-21", Sig-nal Processing, Image Communication, Elsevier Science Publishers, Amsterdam, NL, Band 18, Nr. 8, Sep. 2003, Seiten 721-747, ISSN: 0923-5965.

Li et al., "Multimedia Segment Delivery Scheme and its performance for real-time synchronization control", Communications 1994, ICC '94, Supercomm/ICC '94, Conference on Record "Serving Humanity Through Communications", IEEE International Conference on New Orleans, LA, USA 1-5 May 1994, New York, NY, USA, pp. 1734-1738.

* cited by examiner

FIG 2

```xml
<?xml version="1.0" encoding="UTF-8"?>
<dia:DIA xmlns="urn:mpeg:mpeg21:2003:01-DIA-gBSD-NS"
    xmlns:dia="urn:mpeg:mpeg21:2003:01-DIA-NS"
    xmlns:gbsd="urn:mpeg:mpeg21:2003:01-DIA-gBSD-NS"
    xmlns:xsi="http://www.w3.org/2001/XMLSchema-instance"
    xsi:schemaLocation="urn:mpeg:mpeg21:2003:01-DIA-gBSD-NS gBSSchema.xsd">
    <dia:Description xsi:type="gBSDType">
        <Header>
            <ClassificationAlias alias="MV4" href="urn:mpeg:mpeg4:video:cs:syntacticalLabels"/>
            <DefaultValues addressUnit="byte" addressMode="Absolute" globalAddressInfo="Content/starwars.cmp"/>
        </Header>
        <gBSDUnit syntacticalLabel=":MV4:VO" start="0" length="4"/>
        <gBSDUnit syntacticalLabel=":MV4:VOL" start="4" length="22"/>
        <gBSDUnit start="26" length="99983" marker="Start-1">                    ← M1, M
            <gBSDUnit syntacticalLabel=":MV4:I_VOP" start="26" length="2877"/>   ← X1
            <gBSDUnit syntacticalLabel=":MV4:P_VOP" start="2903" length="64"/>
            <gBSDUnit syntacticalLabel=":MV4:B_VOP" start="2967" length="17"/>
            <gBSDUnit syntacticalLabel=":MV4:B_VOP" start="2984" length="16"/>
            <!--... and so on ...-->
            <gBSDUnit syntacticalLabel=":MV4:P_VOP" start="98296" length="1713"/>
        </gBSDUnit>
        <gBSDUnit start="100009" length="68022" marker="Start-2">                ← M2      X2
            <gBSDUnit syntacticalLabel=":MV4:I_VOP" start="100009" length="1825"/>
            <gBSDUnit syntacticalLabel=":MV4:P_VOP" start="101834" length="1780"/>
            <!--... and so on ...-->
            <gBSDUnit syntacticalLabel=":MV4:I_VOP" start="166802" length="1229"/>
        </gBSDUnit>
        <!--... and so on ...-->
    </dia:Description>
</dia:DIA>
```

D1_BSD

FIG 4

```
<StreamingInstructions xmlns:xsi="http://www.w3.org/2001/XMLSchema-instance"
xsi:noNamespaceSchemaLocation="streaming_instructions.xsd">
    <SynchronizationSource type="urn:mpeg4:audio" uri="bsac_22khz_101.raw">      ⎫
        <FragmentationInstruction type="gbsd:gBSDType"                           ⎬ B_D1
uri="gBSD_Instructionrack.xml"/>                                                 ⎪
    </SynchronizationSource>                                                     ⎭
    <SynchronizationTarget type="text/xml" uri="bsac_22khz_101.xml">             ⎫
        <FragmentationInstruction type="http://www.w3.org/1999/XSL/Transform"    ⎪
uri="fragment_gBSD.xslt"/>                                                       ⎪
        <SynchronizationInstruction>                                             ⎬ B_D21
            <!-- One Target AU maps to each 16th Source AU -->                   ⎪
  Z1─── <SimpleSynchronize frequency="16"/>                                      ⎪
        </SynchronizationInstruction>           ───A                             ⎪
    </SynchronizationTarget>                                                     ⎭
    <SynchronizationTarget type="text/xml" uri="bsac_aqos_22khz_101.xml">        ⎫
        <FragmentationInstruction type="http://www.w3.org/1999/XSL/Transform"    ⎪
uri="fragment_aqos.xslt"/>                                                       ⎪
        <SynchronizationInstruction>                                             ⎪
  Z2─── <ComplexSynchronize>                                                     ⎪
            <!-- The first two synchronization target fragments map to the first ⎪
               synchronization source fragment -->                                ⎪
            <Occurance value="0"/>── N                                           ⎪
            <Occurance value="0"/>── N                                           ⎬ B_D22
            <!-- The following four synchronization target fragments map to the  ⎪
               second synchronization source fragment -->                        ⎪
            <Occurance value="1"/>── N                                           ⎪
            <Occurance value="1"/>                                               ⎪
            <Occurance value="1"/>                                               ⎪
            <Occurance value="1"/>── N                                           ⎪
        </ComplexSynchronize>                                                    ⎪
        </SynchronizationInstruction>                                            ⎪
    </SynchronizationTarget>                                                     ⎭
</StreamingInstructions>
```

Z, $Z_K$

METHOD FOR SYNCHRONIZING CONTENT-DEPENDENT DATA SEGMENTS OF FILES

PRIORITY STATEMENT

This application is the national phase under 35 U.S.C. §371 of PCT International Application No. PCT/EP2006/060808 which has an International filing date of Mar. 16, 2006, which designated the United States of America and which claims priority on German Patent Application number DE 10 2005 016 866.3 filed Apr. 12, 2005, the entire contents of which are hereby incorporated herein by reference.

FIELD

At least one embodiment of the invention relates to a method and/or to a device.

BACKGROUND

For many decades, television signals have been transmitted to television subscribers terrestrially and via cable. In Europe, for example, the PAL standard is used for this purpose, and in North America the NTSC standard. Since all television sets in the respective countries are suitable for receiving the television signal encoded e.g. according to the PAL standard, only one television signal needs to be transmitted for a television program. As a result, a transmission of a plurality of differently encoded television signals of a television program, for example as a function of an image size or a performance capability of the television sets, is not required.

Due to the current introduction of new terminal devices, for example mobile terminals with small screens, it will no longer be possible in the future to provide a single television signal of a television program for all terminal devices. Furthermore it may also be desired to provide different television subscribers with television signals of different quality. In this case, for example, a low-quality television signal, in monochrome for example, is provided for a television subscriber who pays a low monthly fee, whereas for a higher fee a high-resolution color television signal is supplied.

New types of data compression algorithms, such as a video coding standard ITU-T H.264 for example, as well as metadata languages, such as e.g. XML (XML=Extended Markup Language), were developed in order to satisfy these requirements. With the aid of said metadata languages, contents of a document and/or a data stream, such as of a television or video signal for example, can be described in a structured manner by means of an XML schema language definition. Based on this definition, information can be obtained as required, with the aid of which information a scaling of the television or video signal for different television subscribers can be realized.

From the prior art, it is known to use XML-based descriptions of data streams in which individual components of the data stream are described or marked according to their syntactical meaning by means of BSD units (BSD=Bitstream Syntax Description) with freely addressable gBSD units (gBSD=generic Bitstream Description) with regard to different adaptation possibilities. A detailed description can be found in document [1] listed at the end of this application. These descriptions of the data stream are used in order to adapt the data stream to the requirement, for example in terms of data rate or quality of a television signal, of an end subscriber, such as e.g. a television subscriber. For this purpose the description of the data stream can first be suitably transformed, with the data stream then being adapted based on the transformed description.

A Bitstream Binding Language (BBL) method, by which a synchronization can be performed, is known from document [4]. Since BBL is based on XPath during the fragmentation of metadata and a description of a section of the metadata using XPath accounts for a sizable quantity of data, a large overhead is generated by this method. A proprietary method is proposed for the fragmentation of the media data, as a result of which it is generally not made possible to synchronize different data types.

Requirements for streamable digital items are presented in document [2]. These requirements are based on the gBSD description, a distributed and dynamic adaptation being proposed for metadata.

Document [3] discloses two methods in which an adaptation of data streams for streaming applications can be performed with the aid of the gBSD description and XSLT description.

SUMMARY

At least one embodiment of the invention specifies a method or, as the case may be, a device which enables content-related first and second data segments to be synchronized in a simple and standard-compliant manner.

With the method of at least one embodiment for synchronizing content-related first data segments of a first data file and content-related second data segments of a second data file, the first and second data segments will be output in each case sequentially according to their chronological sequence in such a way that, based on a predefinable assignment rule for the first and second data segments, each second data segment will be output together with an associated first data segment.

By way of the method according to at least one embodiment of the invention, it is made possible in a simple manner to synchronize content-related first and second data segments. The synchronization is controlled by way of the predefinable assignment rule. In this way, content-related data segments can be output together according to their chronological sequence. This is of advantage, since the assignment is carried out without the use of timestamps. In this context the term "output" is understood to mean that first and second data segments are, for example, transmitted, stored together or passed on to a processing unit.

Preferably, the predefinable assignment rule is formed in such a way that a second data segment is assigned precisely to a first data segment and a further assignment is carried out following a number of sequentially succeeding first data segments. In this way the assignment rule can be described merely by specification of the number. This is advantageous owing to the very low signaling overhead required for signaling the number.

In an alternative embodiment, the predefinable assignment rule is formed in such a way that for each second data segment a first data segment is assigned by specification of a number, the number representing a position of the first data segment within the chronological sequence of the first data segments. By this, the assignment of first and second data segments is achieved in a particularly flexible manner. In this embodiment a plurality of second data segments can be assigned to a first data segment.

Preferably, content-related first data segments and content-related second data segments of a plurality of second data files can be synchronized on the basis of a combined predefinable assignment rule. By this, the second data segments of a plurality of data files can be output in a synchronized manner. The combined predefinable assignment rule enables a very compact and storage-efficient description.

With the method according to at least one embodiment of the invention, media data, in particular video or audio data, and/or metadata, in particular encoded according to the XML standard, are described by way of the first and/or second data file. In this way it is made possible by way of the method according to at least one embodiment of the invention to synchronize a plurality of different data types.

The first and/or second data segments are preferably generated on the basis of the generic bit stream syntax description or on the basis of the extensible stylesheet language transformation. With this standardized approach to generating the first and/or second data segments it is possible to achieve a cost-effective, reliable and standard-compliant implementation of the method according to at least one embodiment of the invention, since the implementation can make use of standardized modules.

Furthermore, it is beneficial in practice to determine, on the basis of a content-related marker, which first and second data segments will be output first in time. This enables the first and second data files to be accessed at random. In particular a scene change in an image sequence or a change of speaker in a speech sequence is identified by way of the content-related marker. This enables a desired section of a speech or image sequence to be located quickly, since the access is performed in a content-based manner.

At least one embodiment of the invention also relates to a device for synchronizing content-related first data segments of a first data file and content-related second data segments of a second data file, comprising a synchronization module for outputting first and second data segments in each case sequentially according to their chronological sequence, with each second data segment being output together with an associated first data segment based on a predefinable assignment rule for the first and second data segments. The method according to at least one embodiment of the invention can be performed with the aid of the device.

BRIEF DESCRIPTION OF THE DRAWINGS

Further details and advantages of the invention are explained in greater depth with reference to FIGS. 1 to 5, in which:

FIG. 2 shows the contents of a fragmentation description file using the XML description language, wherein a fragmentation of a first and/or second data file is described by way of the fragmentation description file;

FIG. 4 shows the contents of an assignment rule formed with the aid of the XML description language.

Elements having the same function and the same mode of operation are provided with the same reference symbols in FIGS. 1 to 5.

DETAILED DESCRIPTION OF THE EXAMPLE EMBODIMENTS

The method according to the invention is explained in more detail below with reference to an example embodiment according to FIG. 1. In this example a video data stream and an audio data stream are to be synchronized. The video data stream has been compressed for example according to the video coding standard MPEG2, MPEG4 or ITU H.264. Said video data stream is identified in FIG. 1 as the first data file D1. The audio data stream has been coded for example using the audio coding standard ITU G.723.1 or MPEG4-AAC. The audio data stream is designated in FIG. 1 by way of a name second data file D2.

For every first and second data file D1, D2 there exists in each case a fragmentation description file D1_BSD, B2_BSD. Said fragmentation description file D1_BSD, B2_BSD specifies how content-related first and content-related second data segments S1, S2 can be obtained from the respective first and second data file D12, D2. The term "content-related" is understood to mean that first and second data segments have a syntactical meaning within the respective data file, such as e.g. a plurality of succeeding second data segments represent the speech signal of a specific speaker within a dialog sequence. Furthermore, sections of the data file can also be understood thereby, such as e.g. individual images of a video sequence. In the following description data segments always refer to content-based data segments.

FIG. 2 shows a first fragmentation description file D1_BSD for a first data file D1 encoded according to the MPEG4 standard. Data of a first data file D1 of this type is also known as media data MID. The first fragmentation description file D1_BSD uses a gBSD syntax (gBSD=generic bit stream syntax description) for representing the fragmentation rules, the gBSD syntax being based on the XML language. Thus, for example, the line identified by a reference symbol X1 shows that an intracoded video object plane (I-VOP) begins at a byte address 26 within the first data file D1 and comprises 2877 bytes. A detailed description of the mode of operation of the gBSD language is known from [1], the first fragmentation description file D1_BSD being virtually identical with FIG. 9 from [1]. The extensible stylesheet language transformation (XSL Transformation or XSLT) represents another option for describing the fragmentation rules. This enables metadata MTD, in particular XML-encoded metadata, to be fragmented. Further information on XSLT can be found in document [1].

Figure 1:
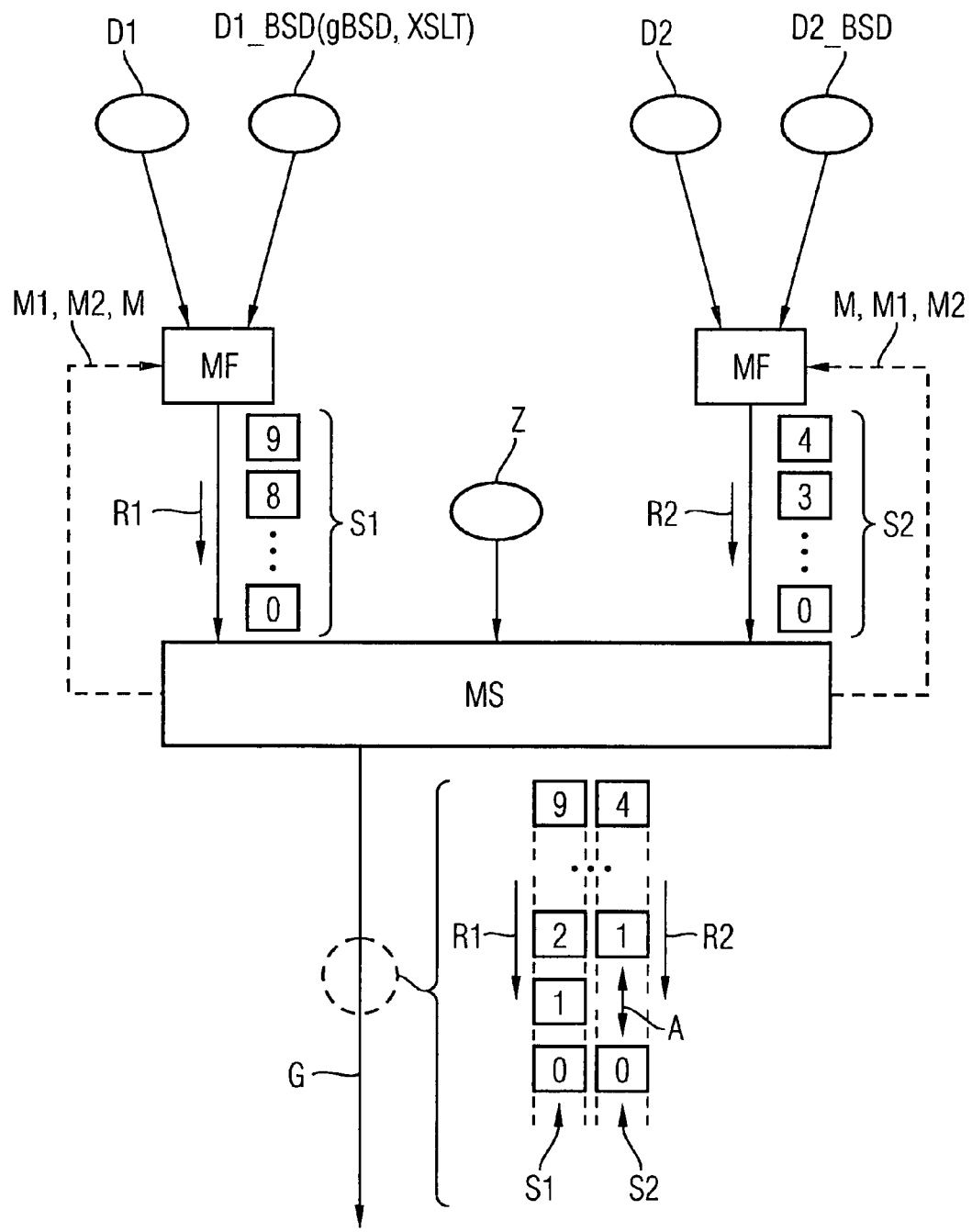
FIG. 1 shows a device for performing the method according to an embodiment of the invention.

According to FIG. 1, the first data file D1 and the first fragmentation description file D1_BSD are supplied to a fragmentation module MF. This takes first data segments S1 from the first data file D1 according to the fragmentation rule of the first fragmentation description file D1_BSD. Said first data segments S1 are passed by the fragmentation module MF to a synchronization module MS in the same chronological sequence R1 in which they are to be output. By the first data segments S1 is meant data segments of the first data file D1 which have a content-related meaning for the first data file D1, such as e.g. individual images in a video sequence or individual spoken words in an audio sequence.

In this case the chronological sequence identifies that sequence of individual first data segments S1 in which, for example, the latter are played back visually or made audible. For example, one data segment contains the word "Good" and a further data segment the word "Morning", so the data segment containing "Good" is output first, and then the data segment containing "Morning". This chronological sequence R1 is represented symbolically in FIG. 1 by an arrow with the reference symbol R1. Additionally printed in the individual first data segments S1 are numerals which indicate said chronological sequence R1. Thus, the first data segment with the numeral 0 is output first, then the one with the numeral 1, and finally the first data segment with the highest numeral, i.e. with the numeral 9. The use of these numerals has been chosen solely to illustrate the method according to the invention more clearly and does not constitute a requirement for the implementation of the method according to an embodiment of the invention.

A similar procedure to that described above is followed in order to implement the fragmentation of the second data file D2 by way of the second fragmentation description file D2_BSD and hence to output the content-related second data segments S2 in the chronological sequence R2.

Figure 3:
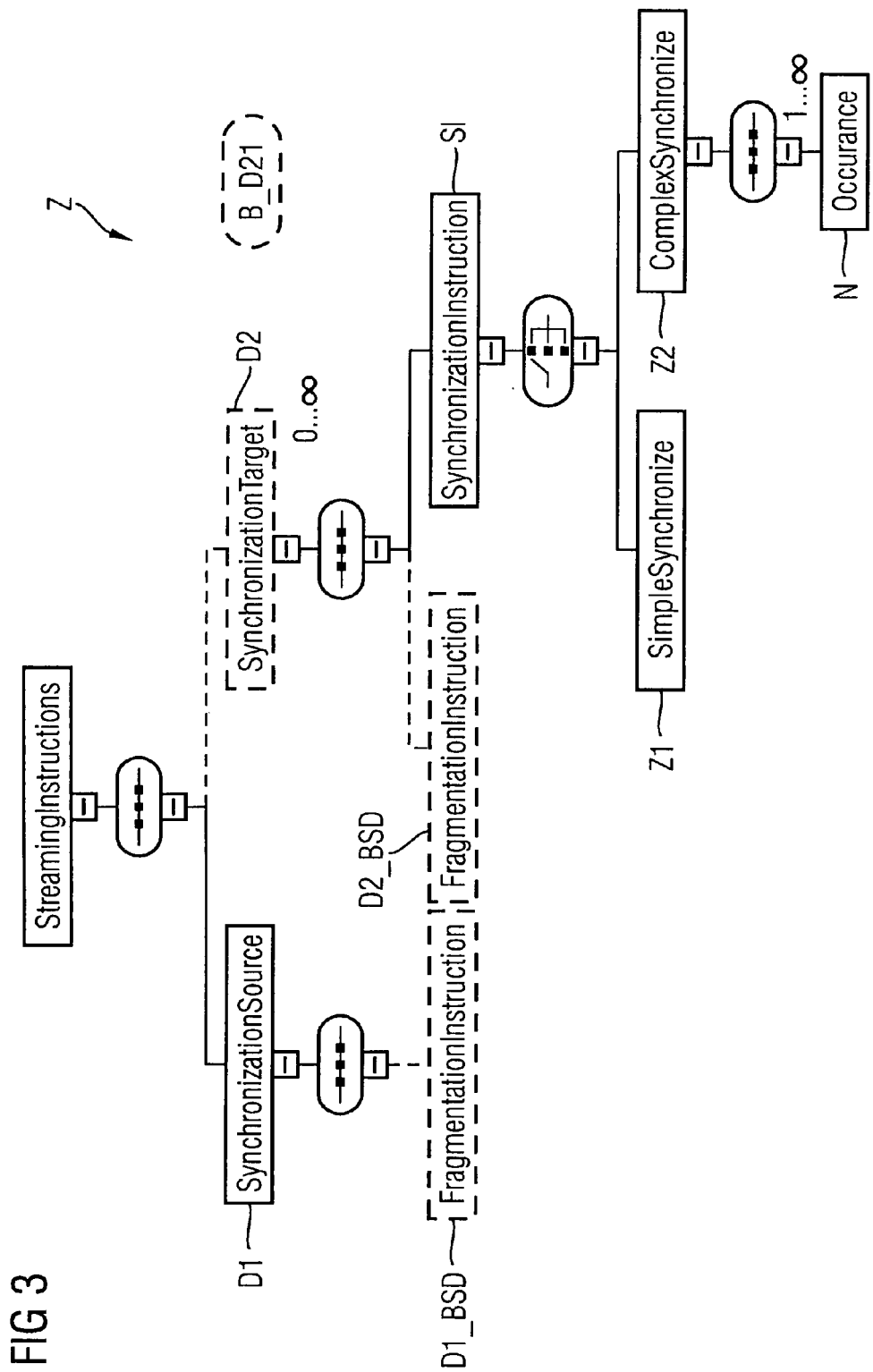
FIG. 3 shows a tree diagram for the pictorial representation of an assignment rule.

In a next processing step of the method according to an embodiment of the invention, the first and second data segments S1, S2 are synchronized on the basis of a predefinable assignment rule Z. FIG. 3 shows a possible layout of an assignment rule Z of this type in the form of a tree structure. The tree structure shows dependencies within the assignment rule Z indicated by means of dashed or unbroken connecting lines on the one hand and, on the other, keywords for using said assignment rule Z in the form of an XML-based description. A start of the assignment rule Z can be identified in an XML-based document, such as can be seen e.g. in FIG. 4, by an XML start word "StreamingInstructions".

This is followed by the first data file D1 with an XML name "SynchronizationSource" and optionally the fragmentation rule by specification of the first fragmentation description file D1_BSD with an XML name "FragmentationInstruction". Alongside this, at least one second data file D2 with an XML name "SynchronizationTarget" is defined which optionally comprises the fragmentation rule in the form of the second fragmentation description file D2_BSD with an XML name "FragmentationInstruction". For each second data file D2, synchronization information SI is specified by means of an XML name "SynchronizationInstruction", which defines the actual assignment of the first and second data segments S1, S2.

According to an embodiment of the inventive method, the synchronization information SI can assume two different forms.

a) Thus, for example, the second data segment S2 is assigned a first data segment S1 and a further assignment is carried out after a number A of output, sequentially succeeding first data segments S1. If the number A=2, this means that in each case the second first data segment S1 is to be output with the second data segment S2. This constellation is illustrated in FIG. 1. The first and second data segments S1, S2 are output in their chronological sequence R1, R2 by the synchronization module MS at the latter's data output G. First, the respective first content-related first and second data segments S1, S2 with the numeral 0 are forwarded. Since the number is A=2, the next first data segment S1 with the numeral 1 is now output. Next, a first and a second data segment S1, S2 with the numeral 2 and 1 respectively are in each case output together at the data output G. Finally, the first data segment S1 with the numeral 9 and the second data segment with the numeral 4 are output. This procedure is identified in FIGS. 3 and 4 by means of an XML name "SimpleSynchronize" and a reference symbol Z1. In FIG. 4 the value of the number A is for example A=16.

b) The use of the number A firstly enables only one single second data segment S2 to be synchronized with a first data segment S1. Secondly, the intervals at which a first and a second data segment S1, S2 can be output together are permanently predefined by the number A.

This means that in an alternative embodiment the predefinable assignment rule Z can be formed in such a way that for each second data segment a first data segment S1 is assigned by specification of a number A, where the number N represents a position of the first data segment S1 within the chronological sequence R1 of the first data segments S1.

Figure 5:
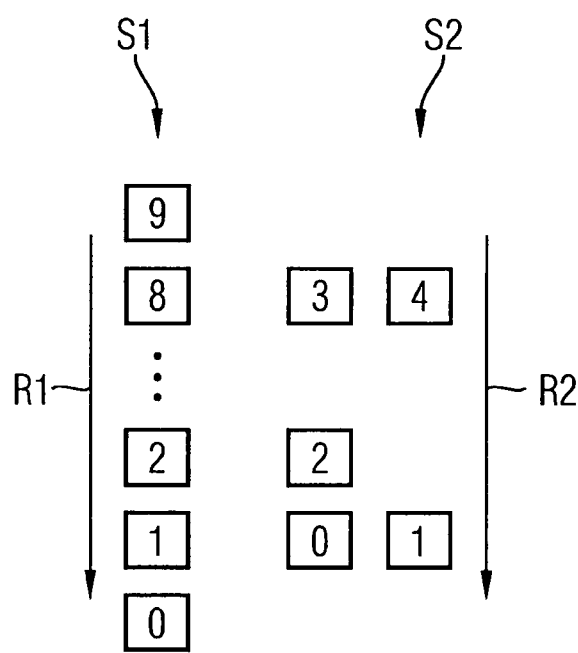
FIG. 5 shows a chronological arrangement of synchronized first and second data segments S1, S2.

This alternative is explained in more detail with the aid of an example according to FIG. 5. The first and second data segments S1, S2 are to be output in the arrangement according to FIG. 5. For this purpose the assignment rule Z can include the following rule: V={1, 1, 2, 8, 8}. This means that the first and second content-related second data segment S2, i.e. those with the numerals 0 and 1, are to be synchronized with the second content-related first data segment S1, which bears the numeral 1. Furthermore, the next second data segment S2 with the numeral 2 is to be output together with the first data segment S1 with the numeral 2. Finally, the fourth and fifth second data segment S2 with the numerals 3 and 4 are to be output together with the first data segment with the numeral 8. Accordingly, the above rule V={1, 1, 2, 8, 8} describes for each second data segment S2, and moreover in the chronological sequence R2, the chronological sequence R2 corresponding to the reading out of said rule V from left to right, for which first data segment S1 a synchronization has to be performed. In this case the number within the rule corresponds to the number N, which corresponds in this exemplary embodiment to the numeral of the first data segment S1.

The rule is presented somewhat differently in FIG. 4. In this case the rule for the chronological sequence R2 applies not from left to right, but from top to bottom. This means that the first two second data segments S2 are output with the first data segment S1 with the number 0, the following further four second data segments S2 are assigned to the first data segment S1 with the number 1 and are then output together in each case. This variant of the assignment rule Z is marked in FIG. 3 by way of a reference symbol z2 or an XML name "ComplexSynchronize". The respective number N in the XML document according to FIG. 4 can be identified with the aid of an XML name "Occurance", where said number N can occur several times, as shown in the above rule V.

The first and second data segments S, S2 output at the data output G can each be sent with an RTP packet (RTP=Realtime Transport Protocol), the RTP packets of jointly output first and second data segments S, S2 being provided with an identical timestamp ("time code"). In an alternative, first and second data segments S1, S2 output together in each case can be grouped in a respective RTP packet.

In an alternative extension of the method according to an embodiment of the invention it can be beneficial to determine the first and second data segments S1, S2 to be output first in time in each case within the first and second files D1, D2 on the basis of a marker M. The marker M indicates which first or second data segment S1, S2 is to be read out from the associated first or second data file D1, D2. Thus, the marker M can be stored within the first or second fragmentation description file DL_BSD, D2_BSD in such a way that the fragmentation module MF can unequivocally assign the right position within the associated data file D1, D2. In the example according to FIG. 4, a first and a second marker M1, M2 are inserted, the first marker M1 being identified by means of a text "Start_1" and the second marker by way of a text "Start_2". In this way the first marker M1 for example is transmitted by the synchronization module MS to the fragmentation module MF, whereupon the fragmentation module MF starts forming the first data segment S1 in the line with the reference symbol X1. If the second marker M2 is transmitted, the first data segment S1 begins to be created in the line with the reference symbol X2.

In the previous examples, two data files D1, D2 to be synchronized were considered. In general, more than one single second data file D2 can be synchronized with the first data file D1. For example, there are two second data files D21, D22. For this purpose a combined predefinable assignment rule ZK is formed. A combined assignment rule ZK of this kind is illustrated in the example according to FIG. 4. A first description part B_D1 contains information relating to the first data file D1 or its first data segments S1. A second description part B_D21 includes synchronization information for a first second data file D21 or its second data segments S2. A third description part B_D22 includes synchronization information for the further second data file D22 or its second data segments S2. The second description part B_D21 was formed according to the first assignment rule Z1, and the third description part B_D22 according to the second assignment rule Z2.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

DOCUMENTS

[1] Panis G. et al., "Bitstream Syntax Description: A Tool for Multimedia Resource Adaptation within MPEG-21", Signal Processing, Image Communication, Elsevier Science Publishers, Amsterdam, NL, Volume 18, No. 8, Sep. 2003, pages 721-747, ISSN: 0923-5965
[2] S. Devillers et al., "Metadata streaming use case and requirements", ISO/IEC JTC 1/SC 29/WG11 M11638, Hong Kong, Jan. 2005-04-08
[3] H. Hellwagner et al., "Report of CE on Bit-Stream Adaptation in Constrained and Streaming Environments", ISO/IEC JTC 1/SC 29/WG11 M11706, Hong Kong, Jan. 2005
[4] I. Burnett et al., "Bitstream Binding Language—A Grammar for Digital Item Transport", ISO/IEC JTC 1/SC 29/WG M11611, Hong Kong, Jan. 2005

The invention claimed is:

1. A method for synchronizing content-related first data segments of a first data file and content-related second data segments of a second data file, the method comprising:
sequentially outputting, by a device for synchronizing content-related data, the content-related first data segments and the content-related second data segments according to their chronological sequence in such a way that each of the content-related second data segments is output together with an associated one of the content-related first data segments on the basis of an assignment rule for assigning each one of the content-related second data segments to one of the content-related first data segments.

2. The method as claimed in claim 1, wherein the assignment rule is formed in such a way that each of the content-related second data segments are assigned to precisely one of the content-related first data segments and a further assignment is carried out after a number of sequentially succeeding content-related first data segments.

3. The method as claimed in claim 1, wherein the assignment rule is formed in such a way that, for each of the content-related second data segments, the content-related first data segments are assigned by specification of a number, the number representing a position of the content-related first data segments within the order of content-related first data segments.

4. The method as claimed in claim 1, wherein the second content-related data segments belong to a plurality of second data files, and the content-related first data segments and the content-related second data segments are synchronized on the basis of a combined assignment rule.

5. The method as claimed in claim 1, wherein media data are represented by at least one of the first data file and the second data file.

6. The method as claimed in claim 1, wherein at least one of the content-related first data segments and content-related second data segments are generated on the basis of at least one of the generic bit stream syntax description and the extensible stylesheet language transformation.

7. The method as claimed in claim 1, further comprising: determining, based upon a content-related marker, which content-related first data segments and content-related second data segments are to be output first in time.

8. The method as claimed in claim 7, wherein at least one of a scene change in an image sequence and a change of speaker in a speech sequence is identified by way of at least one of the first content-related markers and the second content-related markers.

9. A device for synchronizing content-related first data segments of a first data file and content-related second data segments of a second data file, comprising:
a synchronization device configured to output each of the content-related first data segments and the content-related second data segments, sequentially, according to their chronological sequence, each of the content-related second data segments being output together with an associated one of the content-related first data segments based upon of an assignment rule for assigning each one of the content-related second data segments to each one of the content-related first data segment.

10. The method as claimed in claim 2, wherein the second content-related data segments belong to a plurality of second data files, and the content-related first data segments of the first data file and the content-related second data segments are synchronized on the basis of a combined assignment rule.

11. The method as claimed in claim 3, wherein the second content-related data segments belong to a plurality of second data files, and the content-related first data segments of the first data file and the content-related second data segments are synchronized on the basis of a combined assignment rule.

12. The method as claimed in claim 5, wherein the media data include at least one of video and audio data.

13. The method as claimed in claim 1, wherein at least one of media data and metadata are represented by at least one of the first data file and the second data file.

14. The method as claimed in claim 13, wherein the metadata include metadata encoded according to the XML standard.

15. The method as claimed in claim 13, wherein the media data include at least one of video and audio data.

16. The method as claimed in claim 1, wherein the assignment rule is predefinable.

17. The device as claimed in claim 9, wherein the assignment rule is predefinable.

18. The method of claim 1, wherein the assignment rule is maintained in a file separate from the first data file and the second data file.

19. The device of claim 9, wherein the assignment rule is maintained in a file separate from the first data file and the second data file.

20. The method of claim 1, wherein the assignment rule is not based on a timestamp.

21. The device of claim 9, wherein the assignment rule is not based on a timestamp.

22. A method for synchronizing content-related first data segments of a first data file and content-related second data segments of a second data file, the method comprising:

determining an order for the content-related first data segments to be read out from the first data file and an order for the content-related second data segments to be read out from the second data file, the content-related first data segments being ordered according to corresponding first content-related markers and the content-related second data segments being ordered according to corresponding second content-related markers;

assigning, according to an assignment rule, each of the ordered content-related second data segments that are read out from the second data file with a corresponding one of the ordered content-related first data segments that are read out from the first data file; and sequentially outputting, by a device for synchronizing content-related data, in a chronological sequence, each of the assigned content-related first data segments and the assigned content-related second data segments.

* * * * *

UNITED STATES PATENT AND TRADEMARK OFFICE
CERTIFICATE OF CORRECTION

| | | |
|---|---|---|
| PATENT NO. | : 8,605,794 B2 | Page 1 of 1 |
| APPLICATION NO. | : 11/918276 | |
| DATED | : December 10, 2013 | |
| INVENTOR(S) | : Herman Hellwagner | |

It is certified that error appears in the above-identified patent and that said Letters Patent is hereby corrected as shown below:

On the Title Page

Item (75) should read:     Inventors: Hermann Hellwagner, Klagenfurt (AT);
                                                     Jörg Heuer, Oberhaching (DE);
                                                     Andreas Hutter, München (DE);
                                                     Michael Ransburg, Maria Rain (AT).

Signed and Sealed this
Twenty-fifth Day of February, 2014

Michelle K. Lee
*Deputy Director of the United States Patent and Trademark Office*